US008474357B2

(12) United States Patent
Stanojevic et al.

(10) Patent No.: US 8,474,357 B2
(45) Date of Patent: Jul. 2, 2013

(54) ARTICLE SLICER

(75) Inventors: Ivan Stanojevic, Atlanta, GA (US); William M. Brander, Douglasville, GA (US); Thomas P. Gautreaux, Jonesboro, GA (US)

(73) Assignee: Maxwell Chase Technologies, LLC, Atlanta, GA (US)

(*) Notice: Subject to any disclaimer, the term of this patent is extended or adjusted under 35 U.S.C. 154(b) by 1330 days.

(21) Appl. No.: 11/377,469

(22) Filed: Mar. 16, 2006

(65) Prior Publication Data

US 2006/0225547 A1 Oct. 12, 2006

Related U.S. Application Data

(63) Continuation-in-part of application No. 10/943,385, filed on Sep. 17, 2004, now Pat. No. 7,861,629.

(51) Int. Cl.

| | |
|---|---|
| ***B26D 3/20*** | (2006.01) |
| ***B26D 1/03*** | (2006.01) |
| ***A23N 4/16*** | (2006.01) |

(52) U.S. Cl.

USPC ................ 83/281; 83/437.2; 83/751; 83/932; 426/518; 99/643; 414/749.1

(58) Field of Classification Search

USPC ............. 30/194, 195, 233.5, 114, 117; 7/135, 7/136; D28/25; D8/57; 83/24, 109, 167, 168, 83/409.1, 409.2, 410, 418, 425.2, 425.3, 83/431, 447, 435.15, 563, 618, 731, 751, 83/858, 874, 932, 613, 597; 99/537, 538, 99/546, 548, 549, 551, 560, 562, 563; 426/482, 426/484, 518, 558, 320, 481; 3/24, 109, 167, 3/168, 409.1, 409.2, 410, 418, 425.2, 425.3, 3/431, 447, 435.15, 563, 618, 731, 751, 858, 3/874, 932, 613, 597; 414/752.1, 749.1–749.6; 198/339.1

See application file for complete search history.

(56) References Cited

U.S. PATENT DOCUMENTS

| | | | | |
|---|---|---|---|---|
| 716,454 | A * | 12/1902 | Martin | 7/136 |
| 1,657,213 | A * | 1/1928 | Jagenburg | 83/109 |

(Continued)

FOREIGN PATENT DOCUMENTS

| | | |
|---|---|---|
| EP | 1 238 763 | 3/2001 |
| EP | 1 365 897 | 3/2002 |

(Continued)

OTHER PUBLICATIONS

English translation of Japanese Office Action of Oct. 14, 2008 in Japanese Patent Application 2005-134151 filed May 2, 2005, 3 pages.

*Primary Examiner* — Laura M Lee

(74) *Attorney, Agent, or Firm* — Thomas/Horstemeyer, LLP

(57) ABSTRACT

Tomatoes are placed on parallel cutter blades (20) in article openings (46) of an article positioning plate (44). Alternate blades are oscillated in arcuate paths in opposite direction as article pushers (24) move downwardly, pushing the tomatoes through the parallel cutter blades (20). The end slices of the tomatoes are gathered separately in the collectors (96) and are later discarded, while the intermediate slices are received in a transfer plate (78). Gathering plates (100) urge the intermediate slices of the several tomatoes together in one accumulation of tomato slices, and the transfer plate (78) is lowered to a position immediately above the shipping containers (80) and opened to deposit the tomatoes in the shipping containers. A fluid spray nozzle (75) may be positioned to emit a spray of gas or liquid between the fins of the pushers and/or toward the cutter blades (20) and toward engagement with the tomatoes for sterilizing, cleaning, or other treatment of the tomatoes and the adjacent surfaces.

11 Claims, 14 Drawing Sheets

U.S. PATENT DOCUMENTS 1,806,486 A * 5/1931 Mirafuentes ................. 30/233.5
2,236,176 A * 3/1941 Jagenburg ....................... 83/418
2,262,882 A 11/1941 Bucklin ......................... 146/98
2,280,059 A 4/1942 Brustowsky .................. 146/158
2,525,990 A * 10/1950 Wurgaft .......................... 83/417
2,628,648 A * 2/1953 Jagenburg ....................... 83/444
3,057,386 A 10/1962 Massaro ......................... 146/78
3,139,128 A * 6/1964 Urschel et al. .................. 83/111
3,161,215 A 12/1964 Werder et al. ................... 146/94
3,245,447 A 4/1966 Jones ............................ 146/153
3,258,046 A * 6/1966 Lackerman ..................... 83/751
3,351,114 A * 11/1967 Anderson ..................... 426/484
RE26,796 E 2/1970 Lamb ............................ 146/241
3,561,511 A 2/1971 Kummer ........................... 146/2
3,605,984 A * 9/1971 Erekson et al. ............... 198/384
3,696,847 A * 10/1972 Erekson et al. ................. 99/545
3,722,339 A 3/1973 Boyer ................................. 83/4
3,948,132 A 4/1976 Camp .......................... 83/425.3
4,184,397 A 1/1980 Jones .............................. 83/874
4,309,943 A * 1/1982 Larsen et al. ................... 99/509
4,346,634 A * 8/1982 Jones .............................. 83/431
4,368,657 A * 1/1983 Pellaton ....................... 83/356.3
4,436,011 A 3/1984 Jones ........................... 83/425.3
4,625,364 A 12/1986 Adams .............................. 17/55
4,644,838 A * 2/1987 Samson et al. .................. 83/865
4,709,535 A * 12/1987 Mahaffy et al. ................. 53/473
4,856,398 A 8/1989 Kruse et al. ..................... 83/425
4,982,500 A * 1/1991 Ramani ........................... 30/254
4,985,268 A 1/1991 Bingham ...................... 426/482
5,161,447 A 11/1992 Emsens ........................... 83/751
5,167,178 A * 12/1992 Cimperman et al. ........... 83/865
D333,764 S * 3/1993 Osvaldo ........................... D8/57
5,662,033 A 9/1997 Yawman ......................... 99/538
D388,665 S * 1/1998 So .................................. D7/673
6,526,663 B1 * 3/2003 Simmons et al. ............ 30/233.5
6,799,496 B2 10/2004 Verhaeghe ...................... 83/167
2005/0022642 A1 2/2005 Verhaeghe ........................ 83/13
2005/0126012 A1 * 6/2005 Ferman ........................... 30/232
2006/0021484 A1 2/2006 Brander et al. ................... 83/13

FOREIGN PATENT DOCUMENTS

| | | |
|---|---|---|
| EP | WP 1 570 961 | 3/2004 |
| GB | 600131 | 4/1948 |
| JP | 46-1583 | 1/1971 |
| JP | 6-9894 | 2/1994 |
| JP | 7-17093 | 3/1995 |
| JP | 8-257982 | 10/1996 |
| JP | 2001-38681 | 2/2001 |
| NL | 1020132 | 3/2002 |
| WO | WO 02/072321 | 9/2002 |

* cited by examiner

ARTICLE SLICER

CROSS REFERENCE TO RELATED APPLICATION

This application is a continuation-in-part of U.S. patent application Ser. No. 10/943,385 filed in the U.S. Patent and Trademark Office on Sep. 17, 2004 now U.S. Pat. No. 7,861,629.

FIELD OF THE INVENTION

This invention concerns a method and apparatus for simultaneously cutting several articles into parallel slices, discarding the ends of the articles, gathering the intermediate slices from the several articles together in an accumulation of articles, and depositing the articles in an awaiting shipping tray. An example of the invention is a method and apparatus for the slicing of fruits and vegetables, such as ripe tomatoes, with such gentle care as to reduce the bruising and loss of gel and seed from the slices of tomatoes.

BACKGROUND OF THE INVENTION

When a restaurant is to serve sliced food items, such as sliced tomatoes, a substantial amount of preparation time would be required at the restaurant to slice and otherwise prepare the sliced products. After the food products are purchased and delivered to the restaurant, typically they would have to be cleaned, sliced, and made available for placement on the salad, sandwich, or other menu item. It is somewhat difficult for the person slicing the food items to prepare slices of uniform width and consistency and there is a substantial amount of waste because of improper slicing, etc. and the potential for cross contamination in the restaurant.

In the instance of fast food restaurant chains, the owners of the restaurant chain usually desire to present a uniform food product, such as hamburgers of uniform size, appearance and taste, with sliced tomatoes applied to the hamburgers, and with the hamburgers and all of the ingredients being substantially identical from one restaurant to another. It has become important that tomatoes, in particular, be sliced to a desired thickness when placed on sandwiches, salads, etc. of a restaurant of a chain of fast food restaurants. This provides the customer with confidence that the food products will be uniform from one restaurant to the other within the chain of restaurants. Accordingly, restaurant managers now prefer to receive food items in proper condition for placement on a sandwich, salad, etc., for immediate service to the customer without preparation steps such as slicing the food products.

Some restaurant and fast food sandwich chains are sourcing pre-sliced tomatoes for their high volume sandwich businesses. Suppliers of pre-sliced tomatoes need to develop methods of slicing and packaging of the sliced tomatoes that will optimize quality of the product when delivered via the distribution systems to the individual stores. The volumes involved dictate that a degree of automation needs to be introduced to the slicing process. Slicing of tomatoes by machine improves production capacity over hand slicing. However, it can significantly affect the initial quality of the tomato slices as well as their ultimate quality when placed on the sandwich. Uneven slices might result from the use of certain slicers that cut individual slices off of a column of tomatoes fed from above to a rotating blade. Such slices become wedge-shaped from the pressure applied by the blade to the side of the tomatoes. These slices normally drop from the slicer onto a moving belt and are hand-collected and assembled into a package tray. It is established that uneven slices lead to loss of a high proportion of the seed and gel component of the slices, hereinafter referred to as the liquid portion. The quality of the slice at the end of shelf-life is demonstrably inferior to processes where the slices are uniform in thickness.

A commonly used slicer has a circular or S-shaped blade that rotates and cuts slices one at a time. These blades have a thickness in the non-cutting part of the blade that creates pressure on the tissue of the tomato as it forces its way to complete the slice. The thick S-shaped knives bend the slices as they cut them, causing a condition known as feathering that causes cracks and damage to the fragile slices and increases purge of the moisture from the tomato. Thin, serrated edge blades on the other hand, do less damage to the tomato while having the potential to cut even slices.

Manual handling of slices of tomatoes, such as outlined above, adds to potential public health issues from contamination and adds to bruising and liquid loss.

Dropping of slices of tomatoes, whether onto a moving belt as explained above or from a slicing process that slices a whole tomato vertically and drops it into a collection device, usually leads to bruising of the slices and can increase loss of the liquid portion of the slices. Bruising leads to the development of "translucency" in the slices, can accelerate deterioration in quality, and this may adversely affect the taste and texture of the slices.

It is therefore desirable that the design and operation of a tomato slicer take into consideration the delicate nature of the tomato and the importance of minimizing the impact of the slicer on the tomato slices.

Various prior art slicing machines have been developed for the purpose of slicing food products. It is desirable that slicers of articles such as tomatoes function rapidly, uniformly, efficiently, and with enough gentle care to not damage the food products, and with the ability to deliver the food products in a handy, attractive condition. For example, it is desirable that tomatoes be sliced and packaged with such gentle care that the liquid portions of the tomatoes are substantially maintained in the tomato slices, not exuded from the tomatoes, and that the circular shape of the perimeter of the tomatoes be maintained without any objectionable bruising or other damage.

By cutting tomatoes in slices of uniform thickness using a fixed blade slicer with all of the cutting blades at one time, a force is applied by the cutting blades to the tomatoes, tending to squeeze or otherwise collapse the tomatoes during the slicing function. In addition, there usually is a phase in the slicing and packaging operation where the sliced tomatoes are dropped from one operation toward another operation during which there is a hazard that the tomato slices will loose some of their liquid portions and that the slices will become tilted or otherwise misaligned with one another, creating non-uniformity of the product in the shipping tray or other package of sliced tomatoes.

For some food items to be sliced, there is a need to discard the end slices such as the opposite ends of tomatoes since the end slices usually are not acceptable for use in the sandwiches, salads, etc., but may be used for other purposes. Capturing the ends on a conveyor makes it easy to either discard them or convey them to a dicer or other alternative use.

The prior art includes U.K. Patent Specification 600,131 dated Sep. 28, 1945 that discloses a slicer that would push potatoes through parallel cutter wires to form the potatoes into a pair of end slices and a plurality of intermediate slices of uniform thickness. The end slices are to be collected separately from the intermediate slices.

U.S. Pat. No. 6,799,496 discloses a slicing device similar to the U.K. potato slicer that would simultaneously push a plurality of tomatoes through parallel reciprocating cutter blades.

These and other prior art slicers function to slice articles such as tomatoes and possibly other similar edible products into slices of uniform thickness as might be desired by most restaurants.

One of the problems with the known prior art slicers is that some tomatoes are so delicate that the slicing, delivery and packing of the tomatoes tends to damage the tomatoes by expelling the liquid portions of the tomatoes from the slices and bruise the tomatoes. Another problem is that the prior art slicers appear to be limited to cutting products of a small range of sizes that tends to limit the sizes of products that can be successfully processed by the slicer. Yet another problem of the prior art is that because the cutter blades of the slicer reciprocate during the cutting of the articles, a relatively long span of the cutter blades must be available for the cutting function and the supports for the blades are so far apart that the blades tend to bend or twist during the cutting function. Also, there is a hazard that the blades are so long that they tend to flex and the fins of the pusher that pass between the blades while pushing the tomatoes will inadvertently engage and damage the blades.

Another problem with the prior art slicers is maintaining the surfaces of the slicers that have intimate contact with the tomato, etc., free of the residue of the tomatoes.

This invention provides the steps of expediently cutting, gathering, and delivering slices of articles, including tomatoes, in such a way as to reduce the hazard of deterioration of the slices, such as reducing the amount of liquid loss from the slices and reducing the bruising of the slices, and is useful for performing these functions over a larger size range of articles. This invention addresses the problems described above.

SUMMARY OF THE INVENTION

Briefly described, the article slicing method and apparatus that is disclosed herein provides for improvements to the prior art in the various phases of article slicing, gathering and delivery of the sliced articles. The method and apparatus may be used for the gentle and expedient movement of tomatoes through cutter blades, separating the end slices from the intermediate slices, and then the movement of the intermediate slices from the slicing function to a transfer plate, then gathering the intermediate slices in edge standing attitudes on the transfer plate, and delivering the sliced tomatoes with the transfer plate to a shipping tray or other container, with the tomato slices received in the container in an edge standing, orderly, aligned relationship with one another.

Other aspects, collectively or independently, include a method of cutting articles of fruit and the like into an accumulation of multiple parallel slices by placing a plurality of the articles in position on parallel cutter blades with the axes of the articles transverse to the cutter blades, simultaneously pushing the plurality of articles through the cutter blades, and as the articles are pushed through the cutter blades, moving the cutter blades and cutting the articles into parallel slices with each article being sliced into opposed end slices and intermediate slices, separating the opposed end slices of each article from its intermediate slices, depositing the intermediate slices on a transfer plate with the slices oriented in an edge standing attitude, guiding the intermediate slices as they are being deposited on the transfer plate to avoid the intermediate slices of each article from separating and from tilting toward horizontal attitudes when deposited on the transfer plate, gathering the intermediate slices of the plurality of articles on the transfer plate into an accumulation of parallel intermediate slices on the transfer plate with the slices edge standing, moving the transfer plate and the gathered intermediate slices on the transfer plate into juxtaposition above a shipping tray, depositing the gathered slices from the transfer plate to the shipping tray with the slices gathered and oriented vertically, and indexing the shipping tray away from the transfer plate.

Another improvement in the art is the use of a positioning plate that is installed over the parallel cutter blades of the slicer. The positioning plate has a plurality of positioning openings therein for receiving tomatoes. The positioning openings are oval shaped and are larger in breadth than the tomatoes that are to be received therein but small enough to locate each tomato directly on the cutter blades below. The shape of the positioning openings tends to orient the tomatoes in the openings with the longitudinal axis of each tomato transverse to the planes of the cutter blades. Since the sizes of the positioning openings may be larger than the tomatoes, the pushers that urge the tomatoes down through the blades do not have to overcome the resistance of a support device that holds the tomatoes away from the blades. And squeezing or otherwise damaging the tomatoes as they pass through the positioning openings may be avoided.

Another improvement is the adjustability of the positioning plate with respect to the cutter blades of the slicer. When the tomatoes to be sliced have a larger stem and recess about the stem, it is desirable to move the first cutter blade with respect to the positioning plate so as to cut a larger end portion from the tomatoes. Accordingly, the positioning plate is laterally adjustable with respect to the cutter blades so as to reposition its openings so that the stems of the tomatoes are located to a position where more or less of the ends of the tomatoes are sliced away. Thus, the positioning plate includes lateral adjustment means that can be utilized during the operation of the machine to increase or decrease the end cuts of the tomatoes.

The apparatus includes a plurality of parallel cutter blades spaced from one another for cutting the articles into slices. The articles, such as tomatoes, are placed on and are supported by the blades. Alternate ones of the cutter blades move in opposite directions and the cutter blades may be oscillated in arcuate motions along their lengths during the cycle of cutting the articles to enhance the cutting function, and article pushers are used to push the tomatoes through the moving blades.

An article pusher is used for each article to be cut, and each article pusher may include a plurality of pusher fins sized and shaped to move between the cutter blades to assure that the slices are pushed through and beyond the cutter blades. Blade guides maintain the cutter blades in their proper orientation as the blades move.

To begin the cutting cycle, the article pushers are located in the loading position that is laterally spaced from over the article openings of the loading plate so that the articles may be easily placed in the openings of the loading plate. The articles such as tomatoes are placed in the article openings directly on the cutter blades and the article pushers move first from the loading position spaced laterally away from over the cutter blades to a position aligned over the articles on the cutter blades. Each pusher then moves downwardly into engagement with the articles resting on the cutter blades to push the articles gently through the cutter blades. The pushers may be configured to extend downwardly between the cutter blades, thereby pushing the articles on through the blades. This would result in positively moving all slices of the articles through and beyond the cutter blades. The article pushers are then retracted vertically back up through the cutter blades and are moved laterally back to the original positions where they are out of the way for loading the next batch of articles in the positioning plate.

This L-shaped movement of the pushers increases the time in which access can be made to the openings of the positioning plate so that a pick and placer or other loading device can have an early start of its movement of the uncut articles toward the openings of the positioning plate. During the time the pushers are being retracted laterally to move them to their loading position the pick and placer begins its loading cycle. The pick and placer can retract from over the article openings of the loading plate as the article pushers move from their laterally retracted position to the vertical position over the uncut articles now resting on the cutter blades. These coordinated movements significantly reduce the time in which the pick and placer is inactive, thereby increasing the volume of through-put of the slicer approximately fifteen percent (15%) over the time for vertical movement of the article pushers.

The faces of the fins of the article pushers may be contoured so as to present an array of fin ends that together form a concave pushing surface to the articles, tending to stabilize the positions of the articles as the articles are urged downwardly through the cutter blades.

If desired, the cutter blades can be arranged with their cutting edges also presenting an array of cutting edges that form concave recesses for the purpose of stabilizing the articles as the articles are being cut.

Another optional feature of the invention is the fluid delivery means that is positioned in the slicer to apply fluid to the fins of the article pusher and to the cutter blades and to the surrounding surfaces so as to reduce the accumulation of residue from the tomatoes on these parts of the slicer. The fluid delivery means may be utilized to apply gas or liquid to the surfaces of the slicer as the articles are processed along the path through the slicer. For example, the fluid being dispensed may be a gas or a liquid, or a combination gas and liquid, and may include an antimicrobial or other additive that tends to sanitize the surfaces of the slicer. Also, the fluid delivery means may apply fluid to the tomatoes as the tomatoes pass through the slicer, or to the surfaces of the sliced tomatoes after they have been sliced and gathered.

A transfer plate may be positioned beneath the cutter blades a short distance for receiving the sliced articles from the cutter blades substantially without allowing the slices to drop from the cutter blades. This provides for a gentle transfer of the slices, thereby helping to preserve the liquid matter in the tomato slices and tending to avoid bruising of the tomato slices.

Gathering members may be used to gather the intermediate slices of tomatoes. They are positioned at the ends of the transfer plate, and when the slices of the articles are received on the transfer plate the gathering members move toward the center of the transfer plate so as to gently slide the slices together on the transfer plate while still in their edge standing attitude. The gathering of tomatoes in this manner tends to maintain the tomatoes in their upright edge-standing attitudes even after the gathering members are retracted away from the now gathered tomato slices.

Another feature of the apparatus is the movement of the intermediate slices that have been gathered to a shipping tray. A transfer plate that is movable from a position where it receives the tomato slices from the cutter to a lower position juxtaposed the top of a shipping tray for receiving and transporting the intermediate slices of tomatoes. The movement of the transfer plate in this manner tends to reduce the distance of the drops of the tomatoes from the cutting function to the transfer plate and from the transfer plate into the shipping tray, further preserving the liquid in the tomato slices.

Another feature of the slicer is the removal of the ends of the tomatoes during the slicing operation. The tomatoes are placed on the cutter blades with the longitudinal axes of the tomatoes extending transversely with respect to the parallel cutter blades, so that the stem end and heel end of the tomatoes are cut away from the intermediate slices of the tomatoes. Receptacles are provided for the ends of the tomatoes, whereupon the ends of the tomatoes can be discarded or used for other purposes and the intermediate slices are retained. The receptacles of the end slices of the tomatoes are shaped and positioned to provide a guide surface against which the adjacent intermediate slices of the tomatoes can bear in the event of tilting or other lateral movement of the tomato slices as they are moved from the cutter blades to the awaiting transfer plate.

Some of the foregoing features are disclosed in our copending application Ser. No. 10/943,385, which is incorporated herein in its entirety by reference.

Accordingly, it is an object of this invention to provide an improved method and apparatus for slicing articles of food, such as tomatoes, into slices of predetermined thickness.

It is another object of this invention to provide an improved method and apparatus that delivers several sliced articles to one shipping tray or other container, preferably with the slices of all the articles arranged in parallel edge standing attitude and in face-to-face contact with one another.

It is another object of this invention to provide improved methods and apparatuses that expediently, accurately and gently cut food articles, such as tomatoes, while maintaining them in a sanitary condition, and gently delivering the articles to a shipping tray, preferably in an edge standing attitude.

Another object of this invention is to provide a system whereby tomatoes can be economically, rapidly, gently and reliably sliced and packaged for delivery to a food service organization, such as fast food restaurants for immediate use and usually without additional preparation.

Another object of the invention is to provide a sanitizing agent to the surfaces of the slicer, such as but not limited to the pushers and cutter blades.

DETAILED DESCRIPTION

Figure 10:
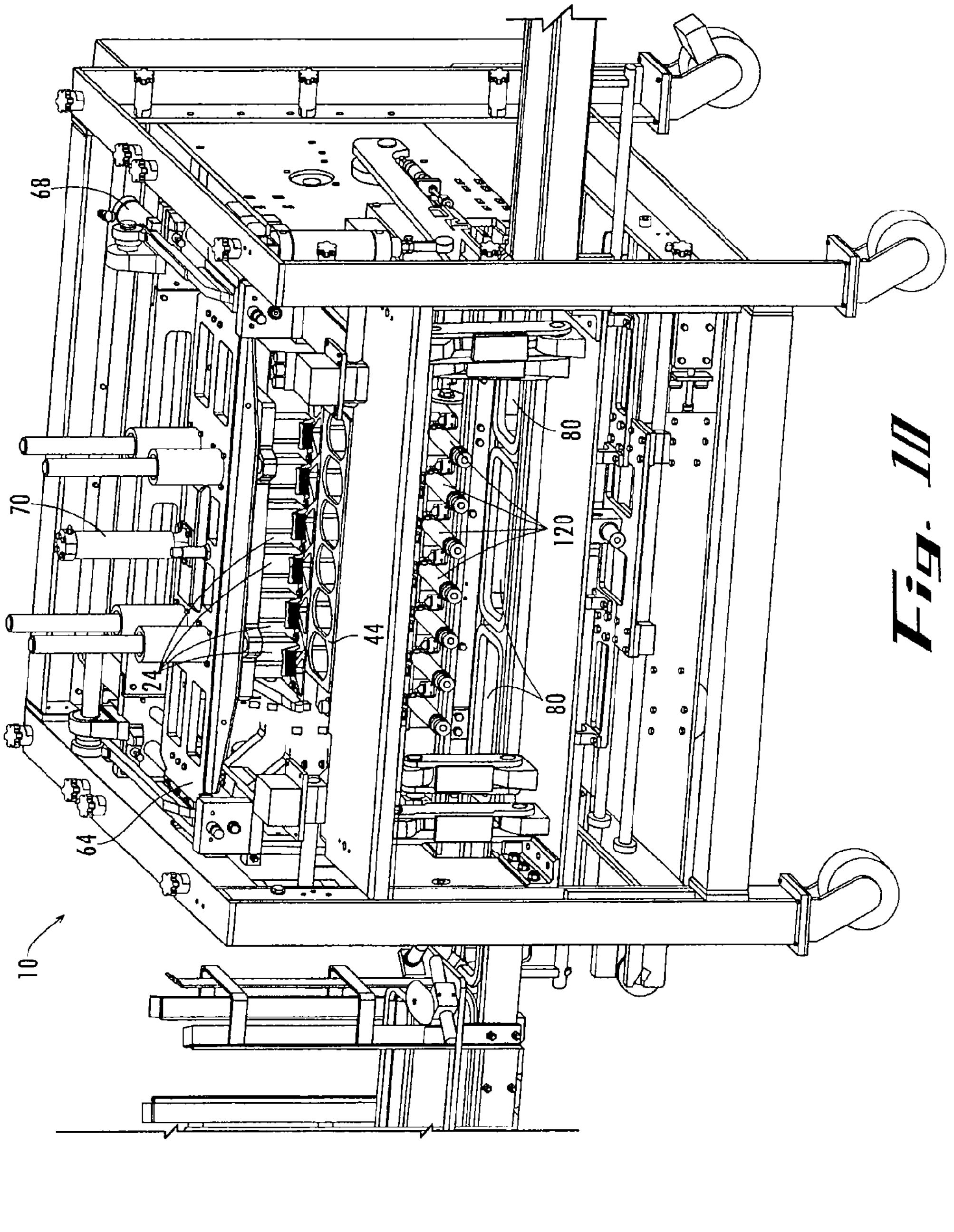
FIG. 10 is a perspective illustration of the slicer.

Referring now in more detail to the drawings in which like numerals indicate like parts throughout the several views, FIG. 10 shows a perspective view of the article slicer 10 that simultaneously slices a plurality of articles such as six tomatoes 11 or other fruits and vegetables, with each article sliced into a pair of end slices and a plurality of intermediate slices. The invention is hereafter described as a tomato slicer, but other articles can be sliced, as may be desired.

Figure 1:
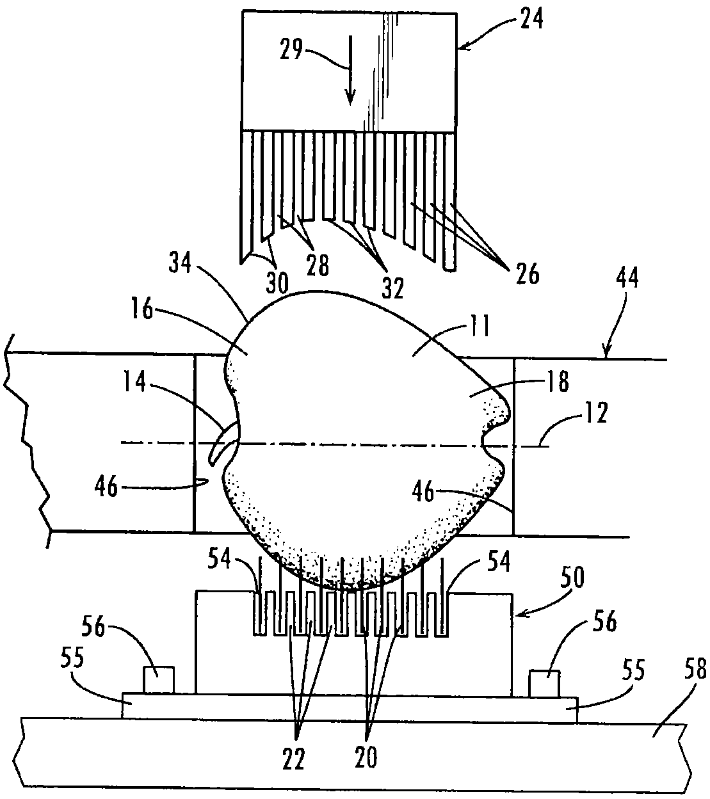
FIG. 1 is a side view of one of the tomatoes that is placed in a positioning opening of a positioning plate upon cutter blades of the slicer, with a pusher in its aligned position over the tomato, just prior to the downward movement of the pusher and the slicing of the tomato.

FIG. 1 shows one cutting station of the article slicer. A plurality of tomatoes 11 are placed in the slicer, with each tomato having a longitudinal axis 12, a stem 14, a stem portion 16, and a heel portion 18. The stem portion and heel portion are at opposite ends of the tomato, with the axis 12 passing through them. The tomato 11 is placed on a plurality of parallel cutter blades 20 that are spaced apart, as shown by the spaces 22 in FIG. 1.

The ends of the cutter blades 20 are mounted on frames, with all of the blades in each frame positionable in the same plane, with first alternate blades mounted on one frame and the second alternate blades mounted on another frame. The ends of the blades are oscillated in arcuate paths, with one set of blades movable in directions opposite to the other set. The opposite directions of oscillation of the alternate blades results in one set of blades oscillating along their lengths in one direction with a rocking movement while the other set of blades oscillates along their lengths in the opposite direction also with a rocking movement, thereby enhancing the cutting function of the blades. This will be described in more detail hereinafter.

Figure 4:
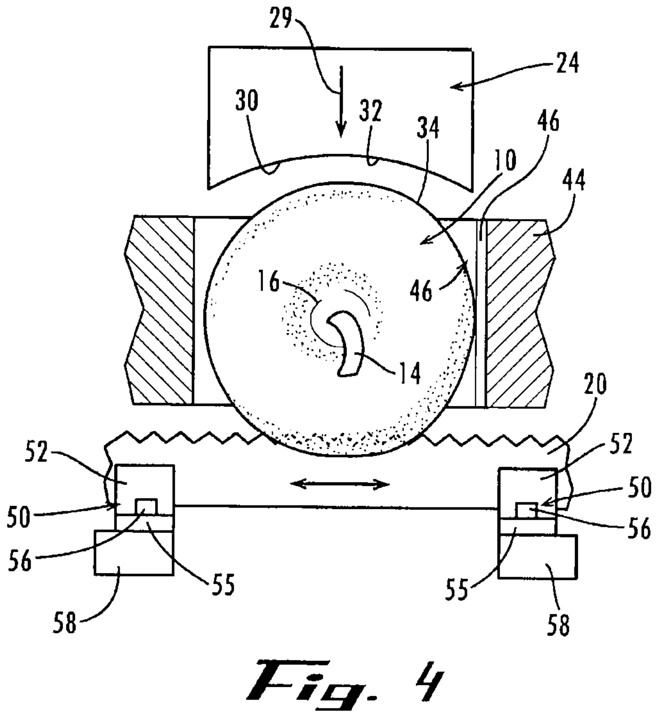
FIG. 4 is an end view of the tomato, and a portion of the positioning plate, cutter blades, and blade guides.
Figure 11:
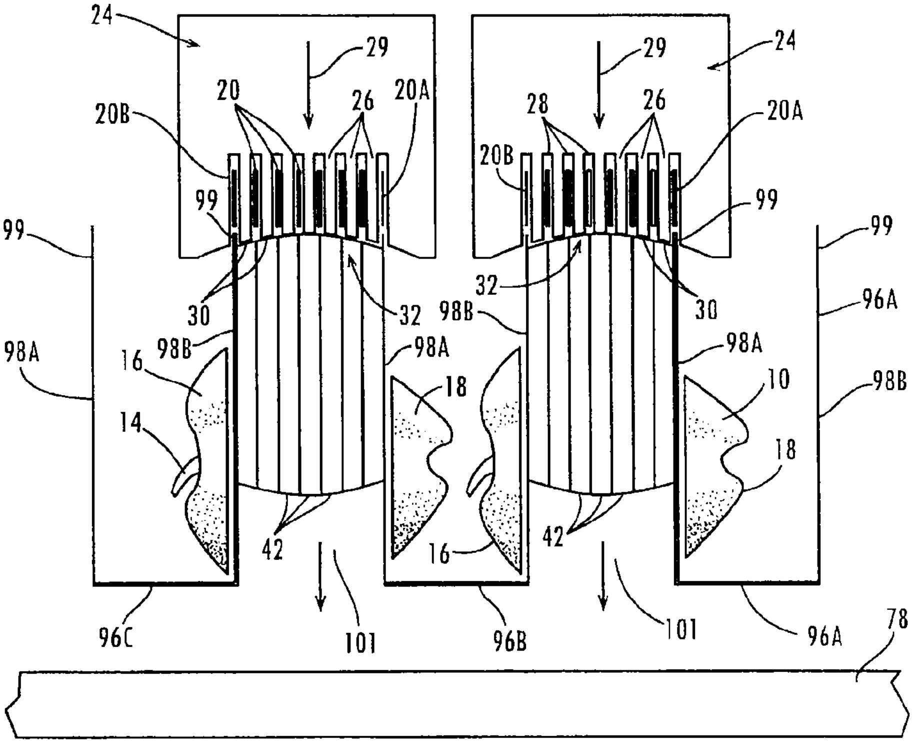
FIG. 11 is a side elevational view of two of the article pushers and their adjacent end collectors, showing how the articles are sliced, with the end pieces collected separately from the intermediate slices.

As shown in FIGS. 1, 4 and 11, an article pusher 24 is positioned above each tomato 11 for the purpose of pushing the tomatoes downwardly through the cutter blades 20. The article pusher includes a plurality of pusher fins 26 that are parallel to and spaced from one another, defining parallel spaces 28 between the fins. The spaces 28 are of sufficient breadth to safely pass about the cutter blades 20 when the pusher is lowered in the downward direction as indicated by arrow 29. The fins are received in the spaces 22 between the cutter blades 20, thereby pushing the sliced tomatoes beyond the cutter blades 20.

In order to make sure that the tomatoes 11 are properly received and urged through the cutter blades 20, the lower end surfaces 30 of the pusher fins 26 are spaced from one another and face the tomatoes and are of varied lengths. The array of the lower ends of the fins are contoured so that together they form a generally concave surface 32. This surface is formed so as to approximately match the convex facing surface 34 of the adjacent tomato 11. Thus, when the article pushers 24 are moved downwardly into engagement with the tomatoes 11, the contoured, concave facing surface 32 of the pusher fins 26 bears against the rounded surface of the tomatoes, usually spreading its pushing force over a significant surface area of the facing surface of the tomatoes, thus avoiding damage to the tomatoes.

The shape of the pushing surface of the fins 26 also tends to initially align the tomatoes on the cutter blades and then push the tomatoes downwardly and to hold the tomatoes in their fixed attitudes on the cutter blades 20, without having the tomatoes slip, rotate or otherwise move transversely with respect to the cutter blades. The thusly stabilized tomatoes 11 tend to move vertically through and beyond the cutter blades 20, with the pushing surfaces of the fins passing between and beyond the blades so that the tomatoes 11 are cut into slices that include end slices 16 and 18 and intermediate slices 42. The end slice 16 is the stem slice and the end slice 18 is the heel slice.

Figure 2:
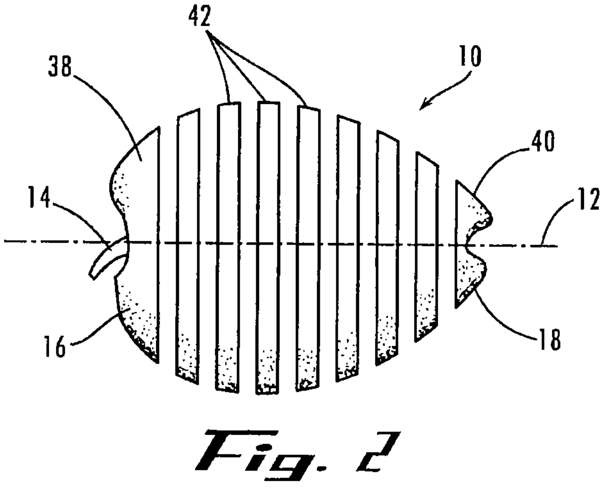
FIG. 2 illustrates a sliced tomato with the slices spread apart for clarity.

As shown in FIGS. 2 and 11, the cutter blades usually are arranged so that the intermediate slices 42 of the tomatoes will be of equal thickness and the end slices 16 and 18 are likely to be somewhat thicker than the intermediate slices. This assures that the intermediate slices are all of acceptable diameter for use at the restaurant and the end slices are not transported to the restaurant, avoiding the food preparer having to discard the end slices.

While FIG. 1 shows the cutting edges of blades 20 all at one height, the blades may be formed of different heights so that the cutting edges of the end cutter blades are somewhat taller than the intermediate cutter blades. This tends to provide a concave support surface for the facing convex surface of the tomatoes, thereby reducing any tendency of the tomatoes to move transversely prior to and during the cutting operation.

As shown in FIGS. 1 and 3-10, article positioning plate 44 is located over the cutter blades 20. A series of article positioning openings 46 are formed in the article positioning plate, one opening for each pusher 24 and its set of cutter blades 20. The article positioning plate and its openings 46 tend to maintain the tomatoes 11 in a proper alignment on the edges of the cutter blades 20 for slicing. The openings 46 may be formed of a size and shape that corresponds to the size and shape of the tomatoes, with the size of the openings 46 being larger than the anticipated sizes of the tomatoes so that the article positioning plate usually avoids frictionally engaging and avoids supporting the tomatoes. The article positioning plate is easily changeable so the size of the positioning openings may be selected to be of a breadth great enough for allowing the tomatoes to come into direct contact with the cutter blades under the influence of gravity. But the positioning openings are small enough to surround the tomatoes and confine the tomatoes in the correct location on the blades and in alignment with the pushers 24.

Figure 3:
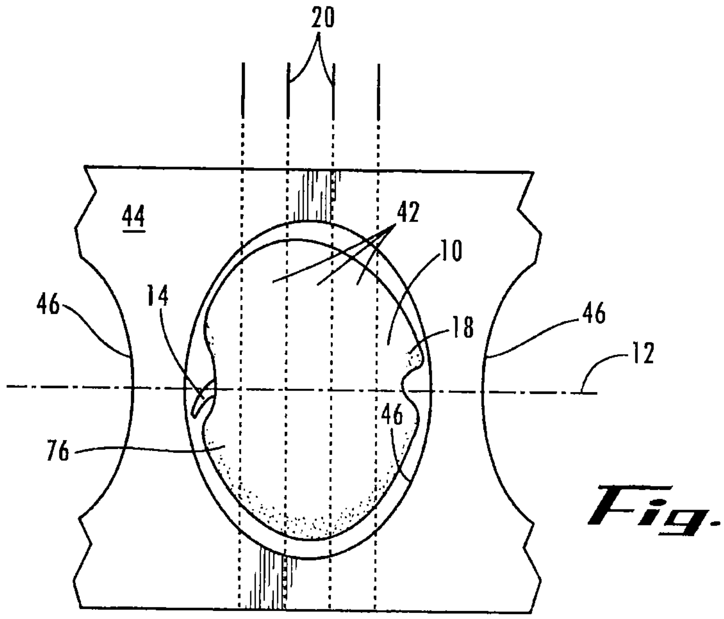
FIG. 3 is a top view of a tomato in a positioning opening of a positioning plate

As shown in FIG. 3, the positioning openings 46 of the positioning plate 44 also may be oval shaped. The oval shape of the openings approximately matches the cross sectional shape of the tomatoes when the tomatoes are placed on their sides with the longitudinal axes of the tomatoes oriented at a right angle with respect to the cutter blades and at a right angle with respect to the long axis of the oval shape of the openings. If a tomato is inadvertently placed in some other attitude in an oval-shaped positioning opening, the tomato usually will not properly fit into the opening, thus alerting the operator of the slicer that the tomato needs to be repositioned in the opening. The oval shape of the positioning openings also tends to assure the tomatoes are always sliced transversely to the longitudinal axes of the tomatoes.

Figure 12:
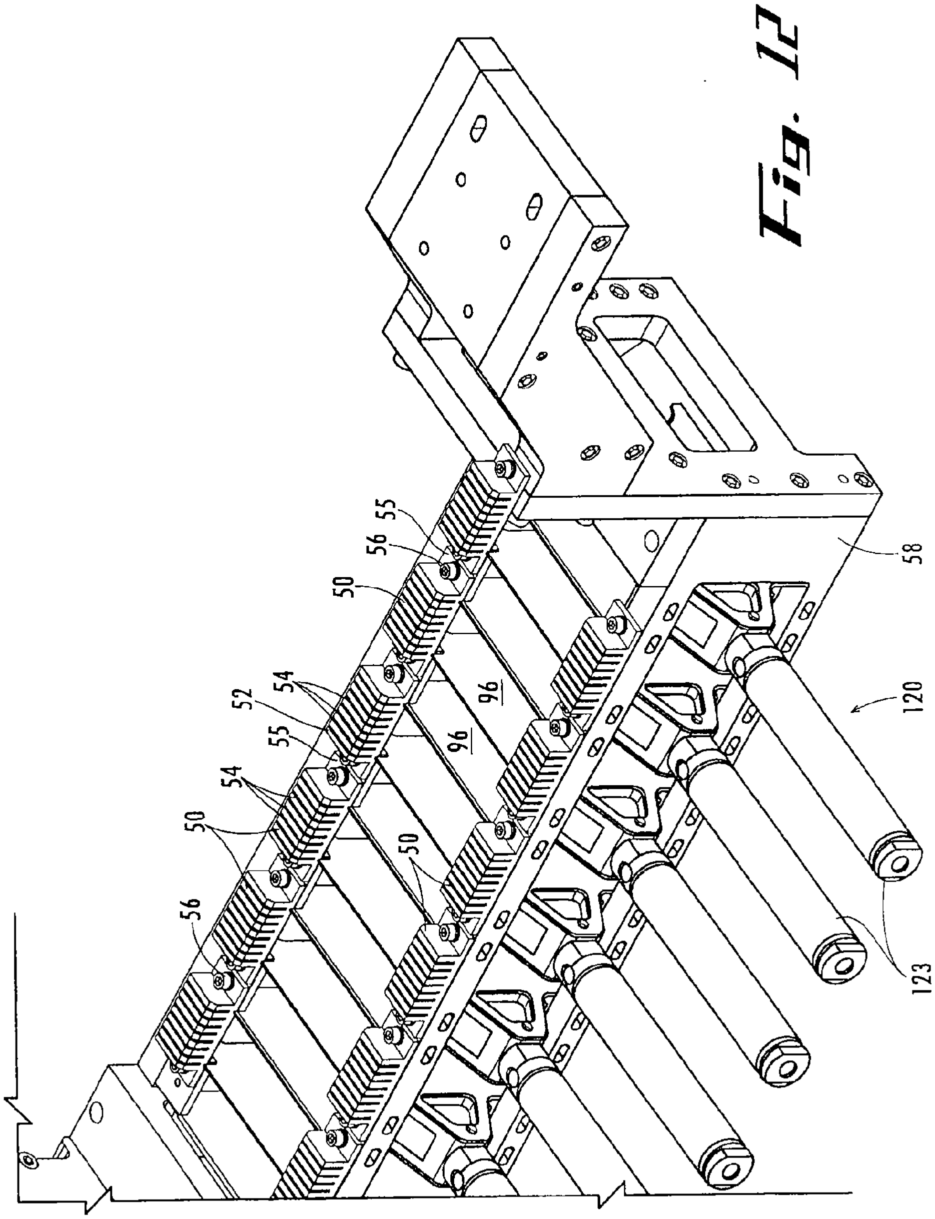
FIG. 12 is a perspective illustration of the end collector baskets and the surrounding framework.

FIGS. 1, 4 and 12 show cutter blade guides 50 that are used to guide the cutter blades 20 during their back and forth oscillations. Blade guides 50 each may include a monolithic block that includes a series of equally spaced blade alignment slots 54 that are oriented parallel to the lengths of the blades 20 and receive the lower portions of the blades so that the teeth of the blades may be left exposed. The slots 54 are deep enough to accommodate the vertical movements of the blades. The cutter blades freely slide along the lengths of the slots 54 while the facing surfaces of the slots hold the blades upright. End flanges 55 receive the connector bolts 56 that hold the cutter blade guide on the support frame 58 of the collector boxes 96 (FIG. 12).

Cutter blade guides 50 are mounted in pairs on opposite sides of and spaced below the article positioning openings 46, in alignment with article positioning openings 46. With this arrangement, when the cutter blades 20 oscillate, their non-longitudinal movements are constrained by the blade alignment slots 54 of the cutter blade guide 50 so that the blades tend to remain in their proper orientation without tilting, bowing, or otherwise deviating from their intended positions. The close placement of the blade alignment slots 54 with respect to the openings 46 of the article positioning plate 44 assures that the stability of the blades 20 is maintained at least at the edge of the openings 46. The fins 26 of the pusher 24 pass between the blades 20 and the spaces 28 between the fins allow the fins to straddle the blades when the pusher moves downwardly and partially through the blades 20.

FIGS. 5, 6A, and 7-9 show the positions of the pick and place mechanism 60 and the pusher 24 of the article slicer 10.

FIG. 10 illustrates the assembled article slicer, showing the components and their relationship in more detail.

Figure 16:
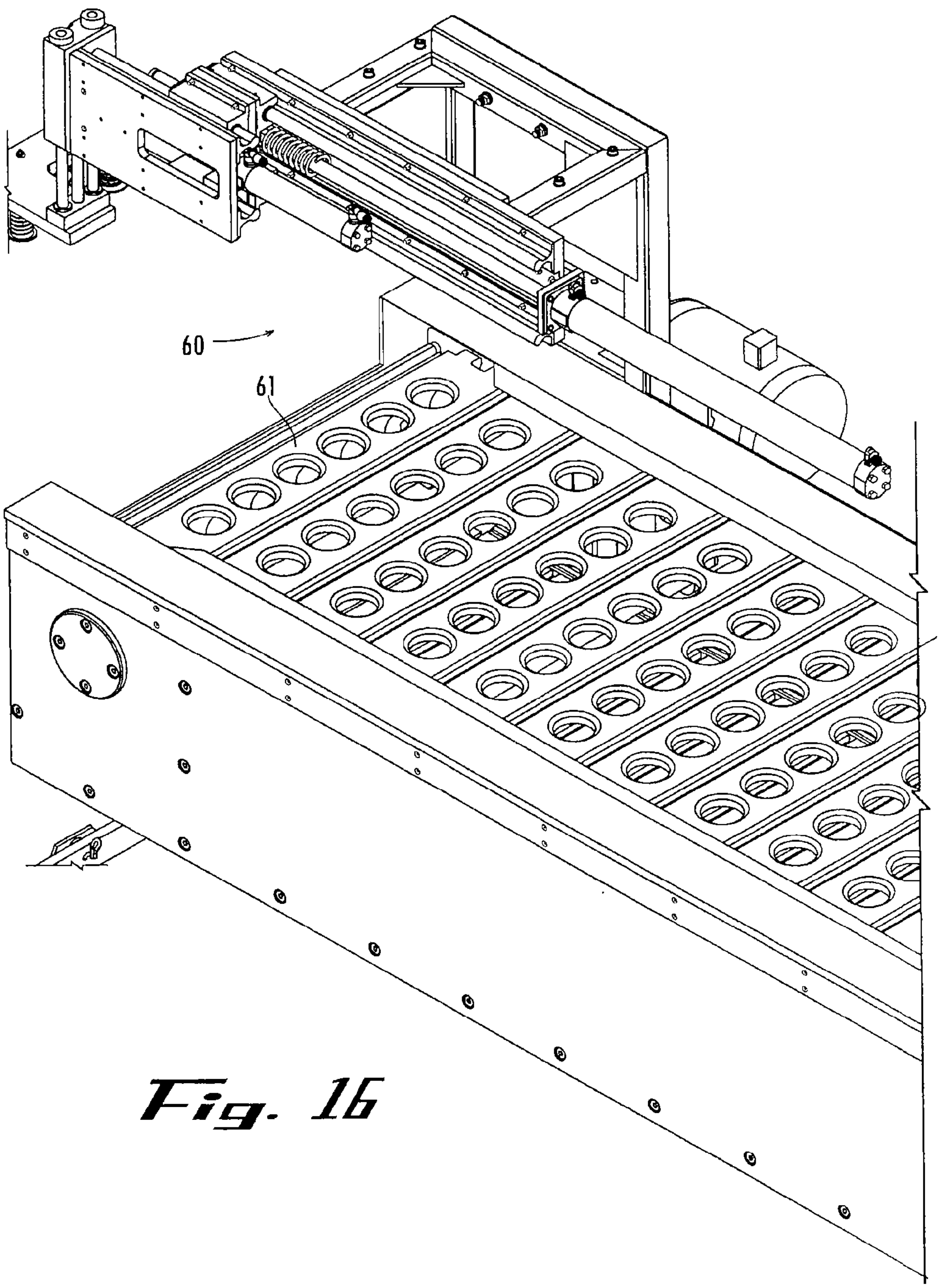
FIG. 16 is a perspective view of a pick and placer.

FIG. 16 shows the pick and place mechanism.

Figure 5:
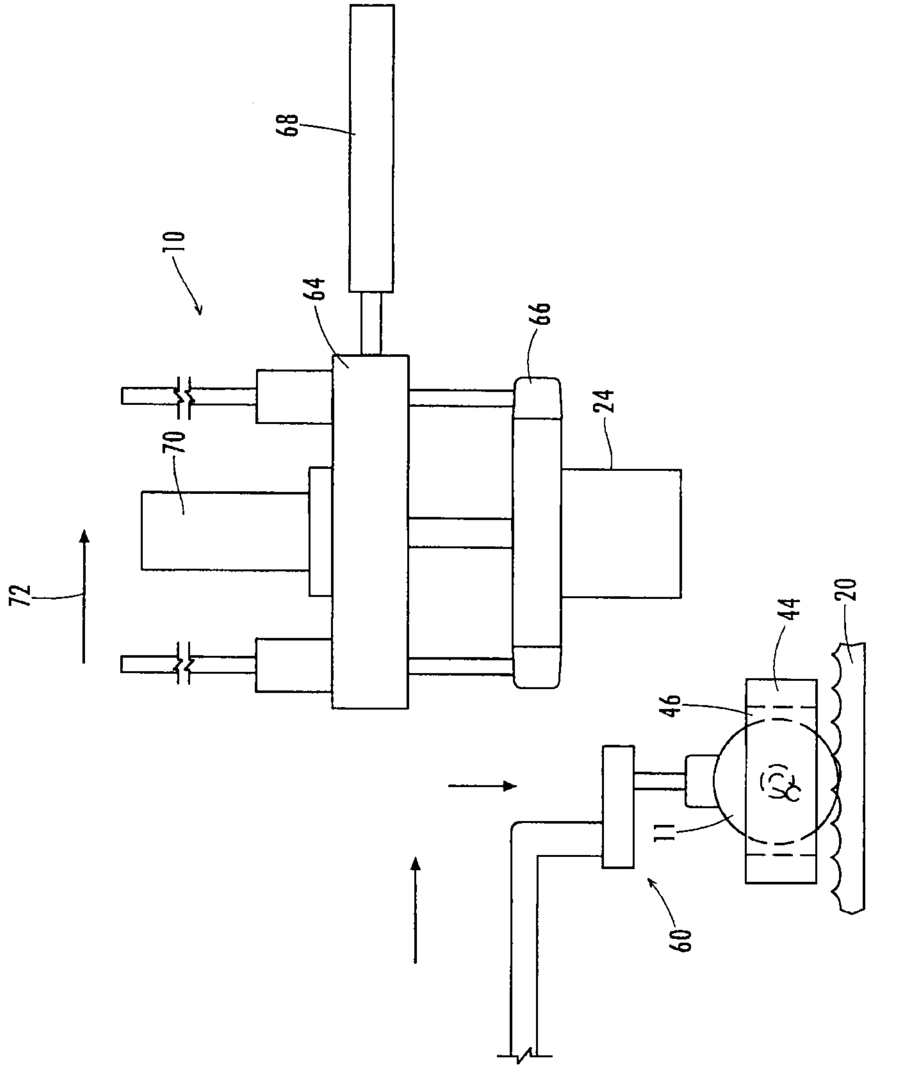
FIGS. 5, 6A, and 7-9 are progressive side elevational views of the pusher, the pusher actuator, and the pick and placer, with respect to the article positioning plate and the cutter blades of the slicer.

As shown in FIG. 5, the pick and place mechanism 60 has retrieved a plurality of tomatoes 11 that are arranged in alignment with one another (and therefore only one shown) and has placed them in the article positioning openings 46 of the article positioning plate 44. The breadth of the article positioning openings 46 is greater than the anticipated breadth of the tomatoes 11 so that the tomatoes are placed on the upwardly facing toothed surfaces of the cutter blades 20 that are positioned below the article positioning openings 46. In the meantime, the article slicer 10 will have been withdrawn rearwardly from over the article positioning openings 46 of the article positioning plate 44, as shown by arrow 72 to its article loading position.

Figure 6A:
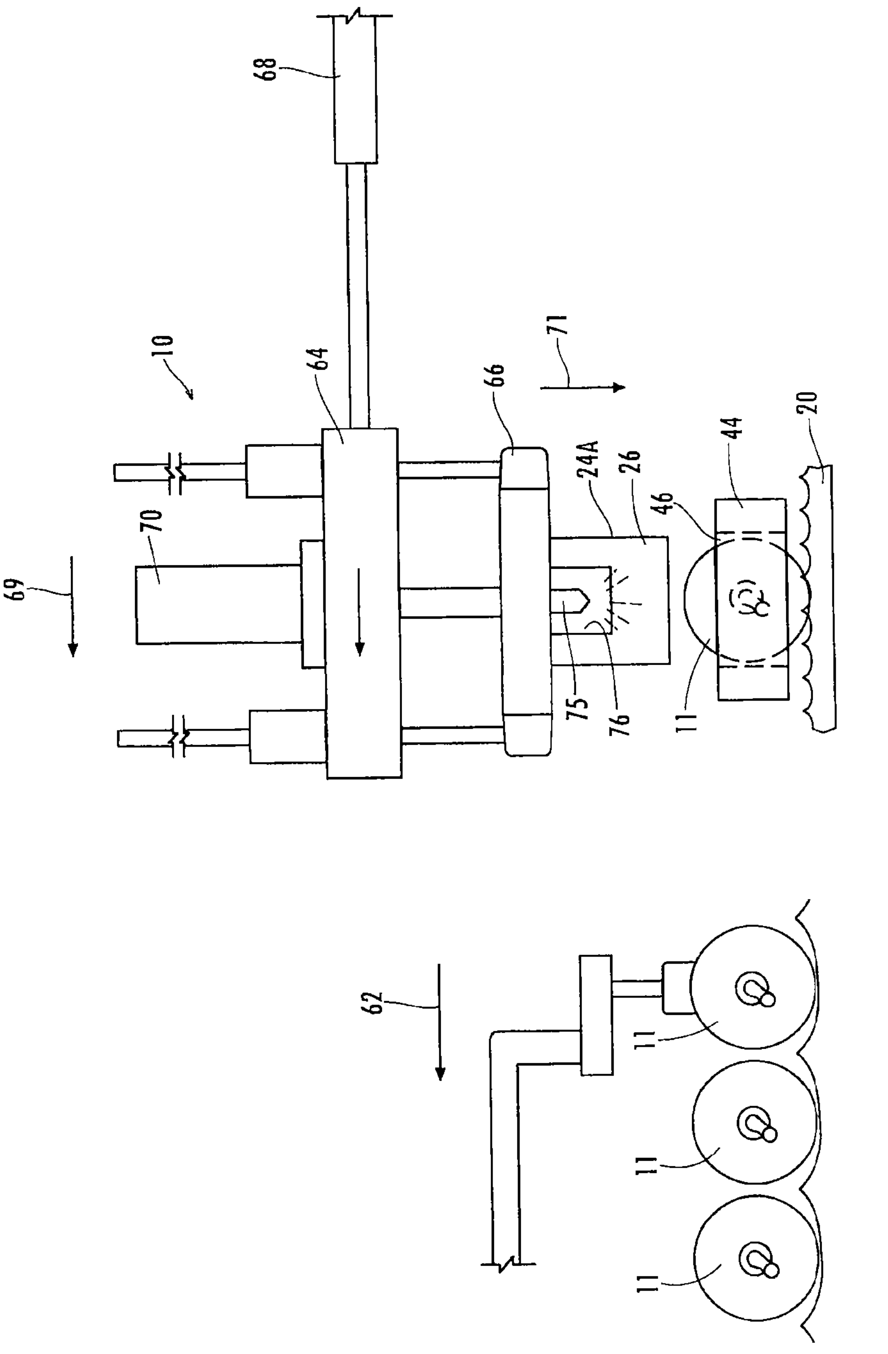

As shown in FIG. 6A, once the tomatoes 11 have been loaded on the cutter blades 20 within the article positioning openings 46, the pick and place mechanism 60 will retract as indicated by its arrow 62 to its position over the supply conveyor 61 where it will begin to retrieve another plurality of tomatoes 11. In the meantime, the article slicer 10 will be moved by pneumatic actuator cylinder 68 and the lateral positioning frame 64 from its article loading position (FIG. 5) in the direction as indicated by arrow 69 of FIG. 6A until it is aligned over the article positioning openings 46 where the tomatoes 11 reside. This is known as the vertically aligned position.

Figure 6B:
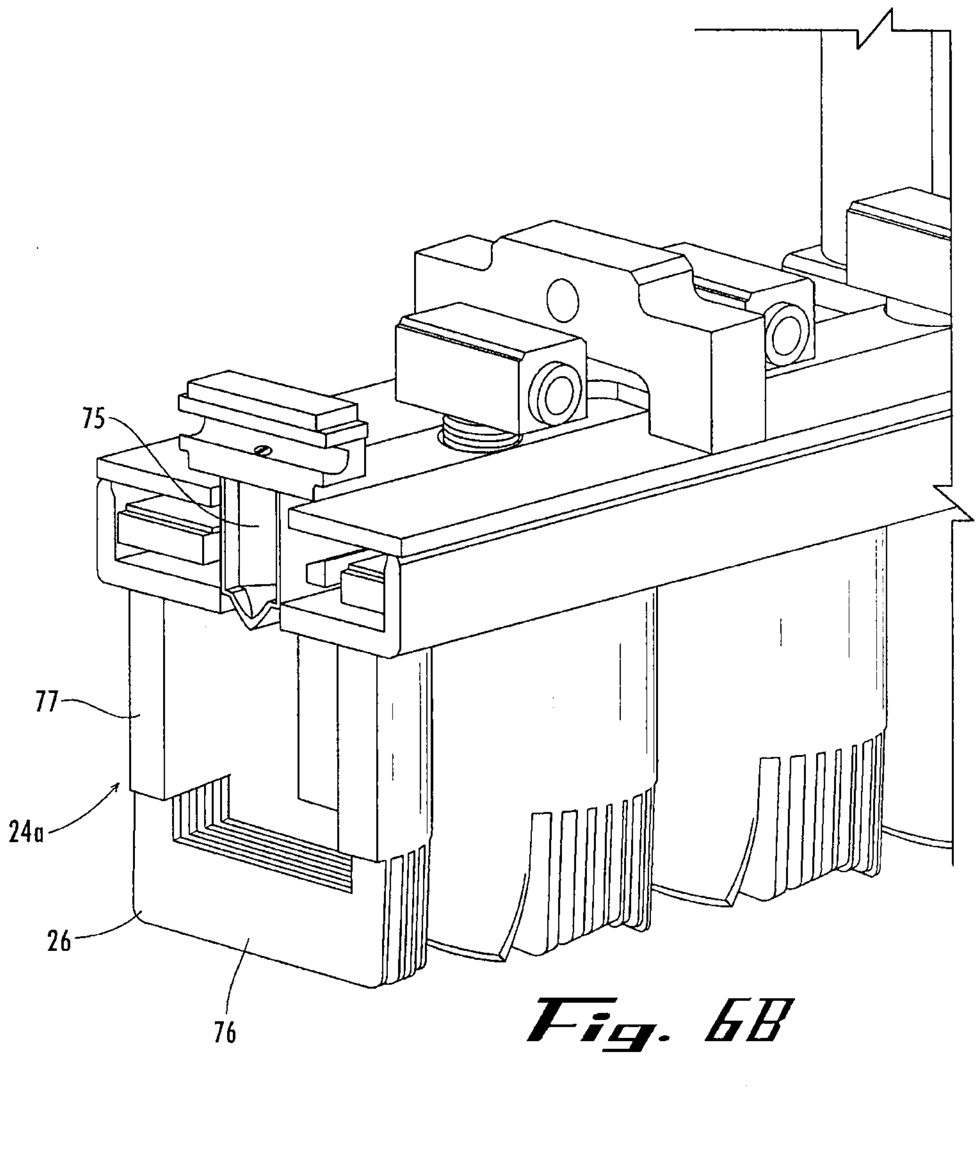
FIG. 6B is a perspective cross sectional view of one of the pushers, showing the fluid spray nozzle in the interior of the fins of the pusher.
Figure 7:
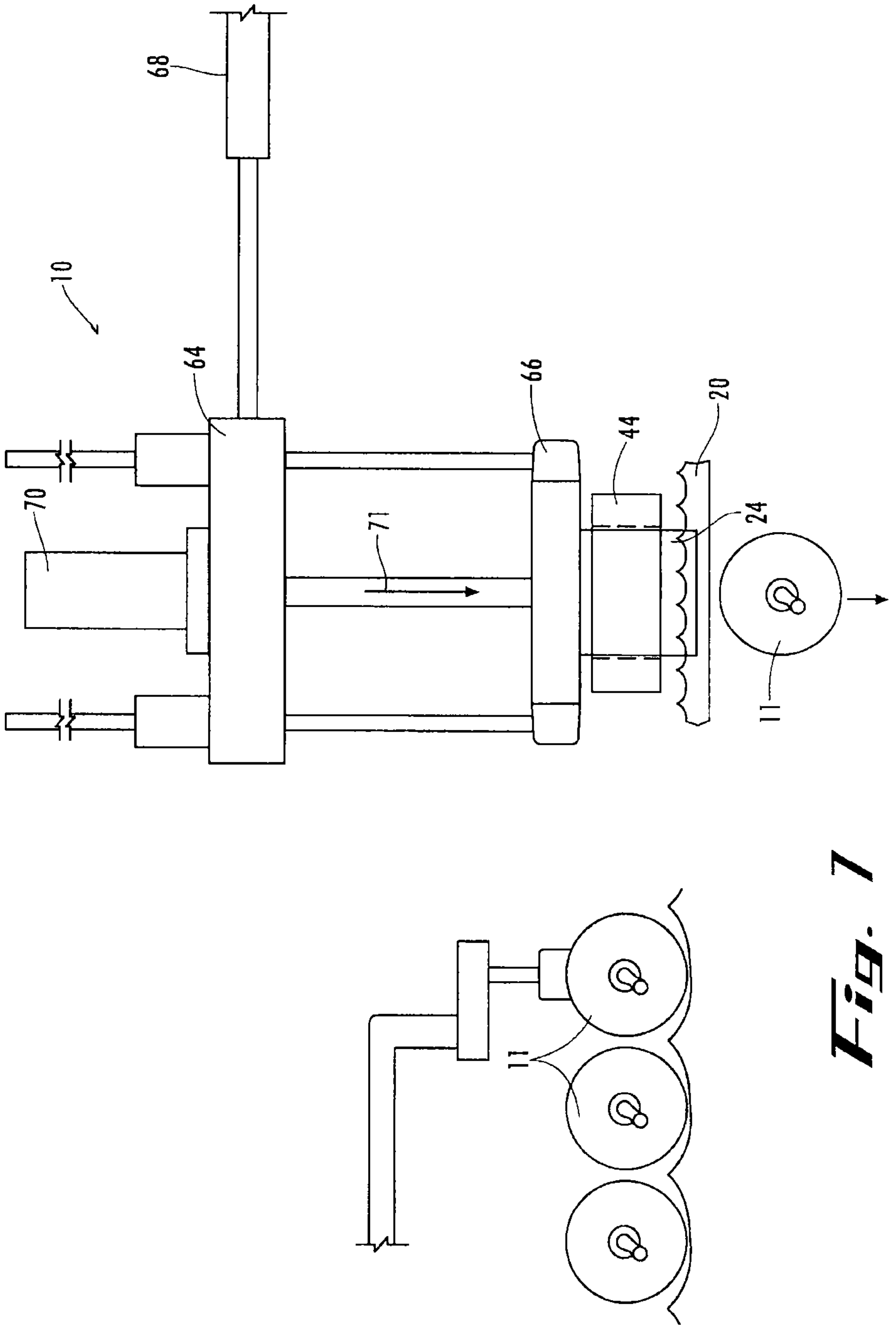

Next, the vertical cylinder 70 moves the vertical positioning frame 66 and the article pushers 24 downwardly as indicated by vertical arrow 71 in FIG. 7, from the position as shown in FIG. 6 to the position as shown in FIG. 7. The article pushers 24 progressively move downwardly through the article positioning openings 46 of the article positioning plate 44, engaging the tomatoes 11 and pushing the tomatoes through the reciprocating cutter blades 20. The now sliced tomatoes 11 move below the level of the cutter blades 20.

Figure 8:
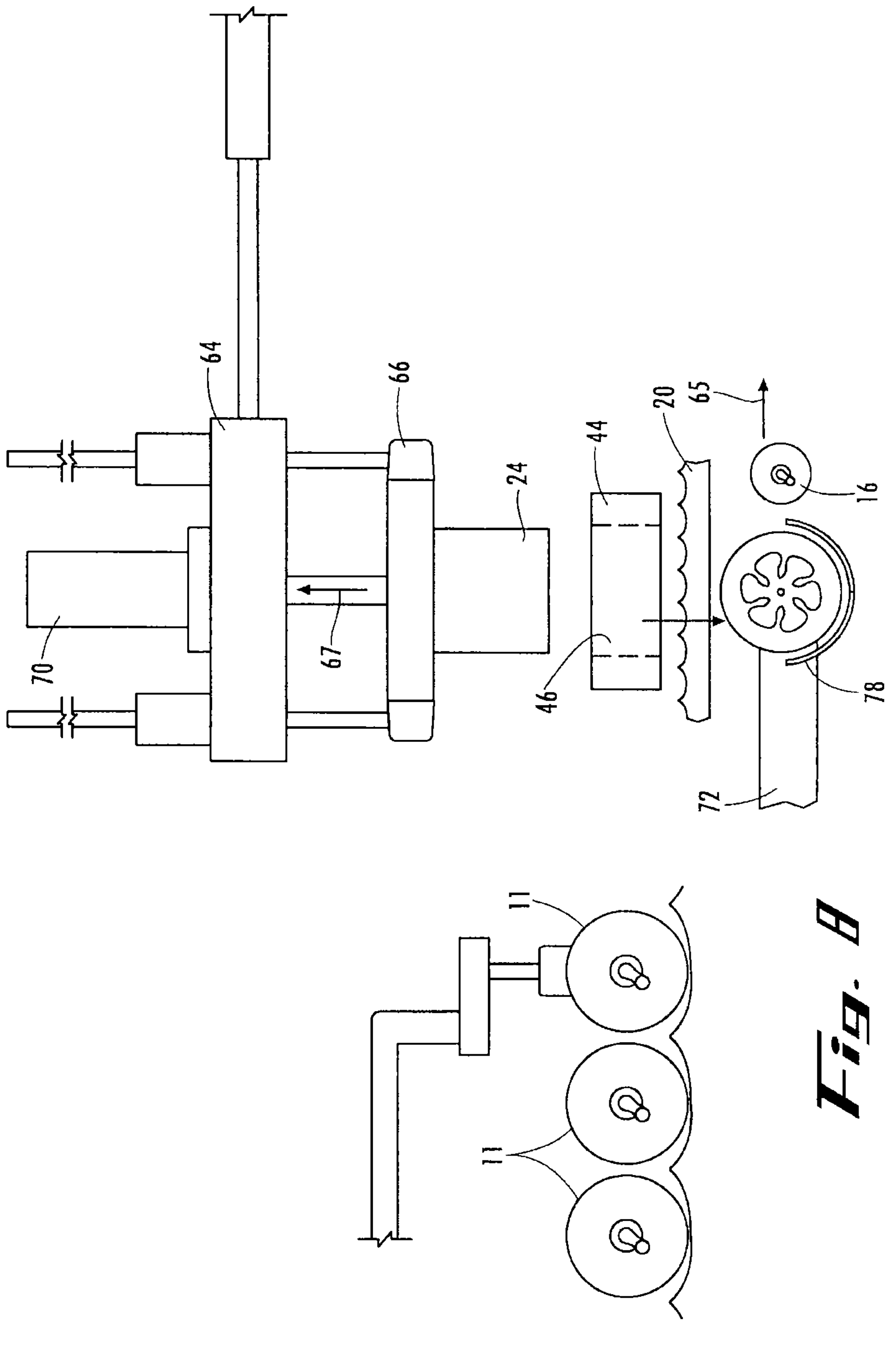

As shown in FIG. 8, once the tomatoes have been cut, the vertical cylinder 70 lifts the vertical positioning frame 66 as indicated by arrow 67 so that the article pushers 24 are lifted upwardly out of the cutter blades 20 and out of the article positioning openings 46 to return to the vertically aligned positions over the article positioning openings 46. In the meantime, as indicated by the arrow 65 in FIG. 8, the stem portions 16 and heel portions 18 of the tomatoes 11 are removed from the intermediate slices of the sliced tomatoes 11 into the collector boxes 98A, 98B and 98C (FIG. 11).

Figure 9:
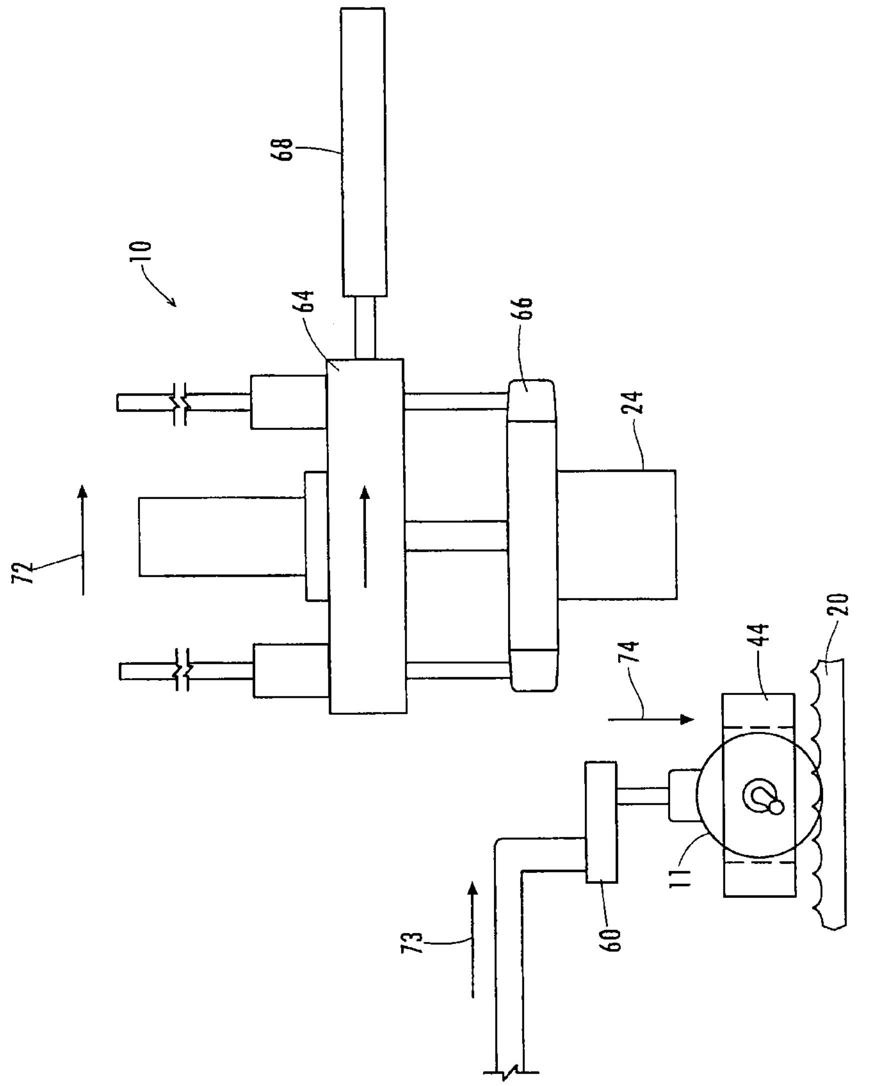

As shown in FIG. 9, once the tomatoes have been sliced, the actuator cylinder 68 moves the lateral positioning frame 64, vertical positioning frame 66 and pushers 24 in the direction indicated by arrow 72, to withdraw the slicer 10 rearwardly from its position aligned over the article positioning openings 46 back to the article loading position. In the meantime, the pick and place mechanism 60 will advance as shown by arrows 73 and 74 toward the slicer to place another row of tomatoes 11 on the cutter blades.

It can be seen from FIGS. 5-9 that when the article slicer 10 begins its rearward withdrawal movement toward its article loading position (arrow 72 of FIG. 9) and then starts another cutting cycle (FIG. 6), the pick and place mechanism 60 can go through its loading movements, by moving the previously retrieved tomatoes 11 as indicated by the horizontal loading arrow 73 and the vertical loading arrow 74 onto the cutter blades 20 and then withdrawing as indicated by arrow 62 (FIG. 6). With this coordinated arrangement of movements of the pick and place mechanism 60 and the article slicer 10, the pick and place mechanism can use some of the time to load the tomatoes on the cutter blades 20 (arrows 73 and 74 of FIG. 9) while the article slicer is being moved horizontally back and forth. This tends to decrease the cycle time for the article slicer from the time that would be required when the article slicer is moved only vertically out of the way of the pick and place mechanism. This reduces the cycle time of the slicer and increases the production capacity of the slicer. Also, this movement allows the height of the slicer to be minimized.

Fluid sprayers may be positioned in the article slicer 10 in positions where nozzles apply fluid to the surfaces of the slicer that contact the tomatoes. The fluids applied to the slicer can be gas, liquid or a combination of or a sequence of gas and liquid. For example, an antimicrobial liquid may be sprayed onto the surfaces of the slicer as the tomatoes are processed through the slicer. The fluid may be directed toward the surfaces of the pusher head fins 26 and the surfaces of the cutter blades 20 (FIGS. 6A and 6B).

FIGS. 6A and 6B illustrate an embodiment of an article pusher 24*a* that includes a fluid sprayer that includes nozzle 75 positioned among the vertical fins 26 of the article pusher. The fins of the article pusher have aligned cut-outs 76 that form a space 77 which the nozzle can occupy. The fluid may be emitted under pressure from the nozzle 75 and sprayed in a general direction toward the fins 26 of the pushers and toward the cutter blades 20, thereby applying the fluid to these parts and the surrounding parts of the slicer. The sprayer fluid may be emitted in each cycle of the pushers, at intervals before, during or after the article pushers 24 engage the tomatoes. Alternately, the sprayer fluid may be emitted at times when the tomatoes are not present in the slicer. Since in this embodiment the fluid is released within the fins of the article pusher, the fluid tends to wash the fins and the cutter blades. If an antimicrobial is used in the fluid, the fluid will tend to sanitize the fins. If the fluid is applied when the tomatoes are being contacted by the fins, the fluid might assist in urging the tomatoes on through the cutter blades. Also, the fluid may be emitted when there are no tomatoes in the vicinity of the fins and cutter blades, with the fins moved downwardly about the cutter blades to assure the fluid is applied to the cutter blades.

While the drawings show the fluid being applied internally of the pusher fins, the nozzles may be placed elsewhere, such as beside the pushers and in alignment with the fins and cutter blades so that the fluid reaches these surfaces.

Figure 14:
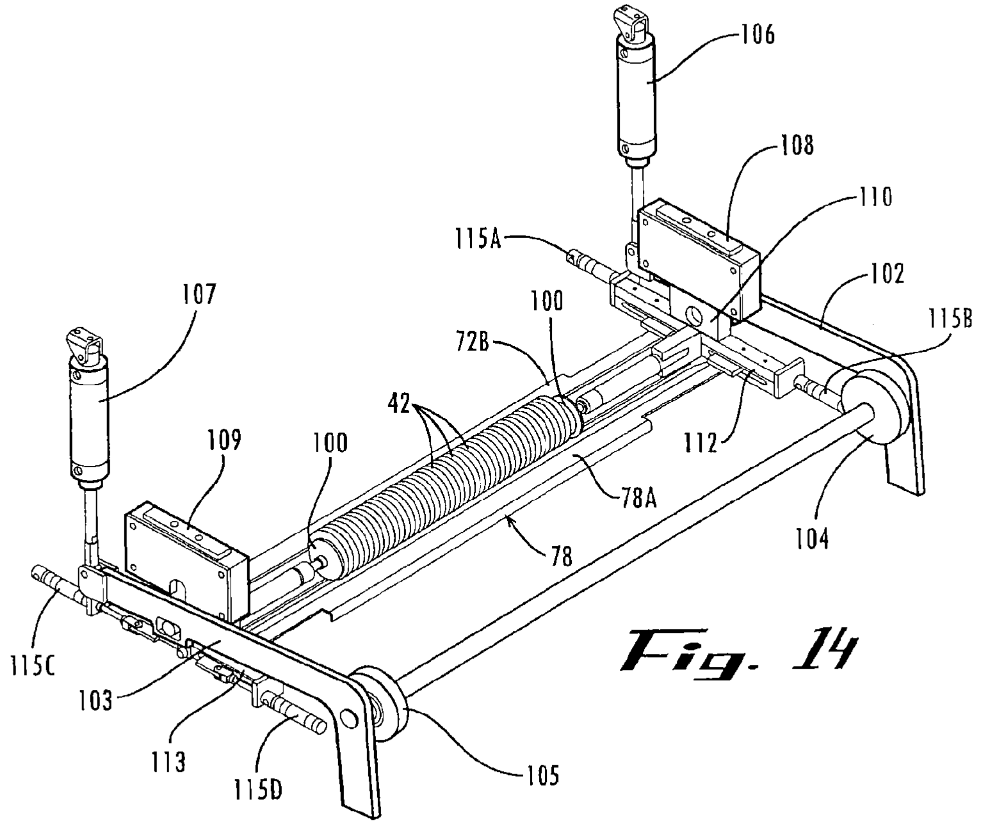
FIG. 14 is a perspective view of the transfer plate and gatherer.

FIG. 11 shows the tomatoes immediately after they have been pushed through the cutter blades 20 by the pusher fins 26. End collectors 96A, 96B, 96C, etc. that are positioned below and intermediate the article pushers 24 are mounted on frame 58. The end collectors receive the stem end slices 16 and the heel end slices 18. The end collectors each include side walls 98A and 98B that have upper edge portions 99 that are aligned with the end cutter blades 20A and 20B. With this arrangement, when the end cutter blades 20A and 20B cut the end slices 16 and 18 from the rest of the tomatoes, the end slices 16 and 18 move on the other side of the side walls 98A and 98B of the collectors 96A, 96B, 96C, etc from the intermediate slices 42, so that the end slices are collected separately in the collectors 96 from the intermediate slices. The intermediate slices continue to move downwardly through the vertical passages 101 between the side walls 98A and 98B of adjacent ones of the collectors toward the transfer plate 78 (FIGS. 11 and 14).

Figure 13:
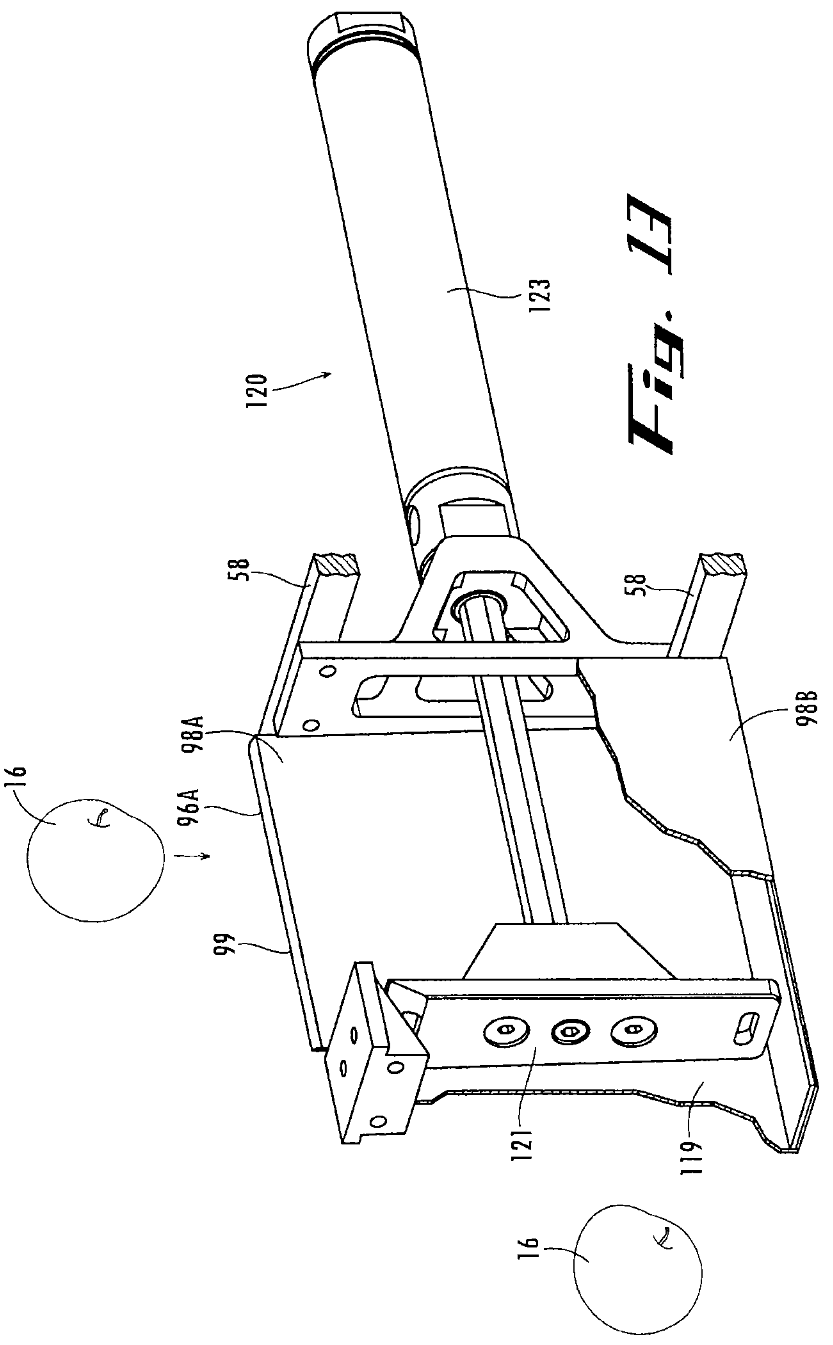
FIG. 13 is a perspective view of one of the collector baskets, with the near side wall partially removed to show the movement of the internal pusher.

The ejectors 120 (FIG. 13) have pusher plates 121 that are reciprocated in the collector housings 122 between the side walls 98A and 98B by the cylinders 123 and the ejectors are used to engage against the end slices 16 and 18 that are deposited in the collectors to eject the end slices laterally from the collectors 96. The ejection of the end slices can be performed by other means, such as by a blast of air or water. In the meantime, the other cutter blades 20 will have cut through the intermediate portion of the tomatoes, forming the intermediate slices 42. While the intermediate slices move vertically the end slices move laterally, therefore separating them from each other.

It will be noted that the intermediate slices 42 pass through the vertical passage 101 closely adjacent the exterior surfaces of the side walls 98A and 98B of the end collectors 96 so that the side walls 98A and 98B of the collector housings tend to contain the intermediate slices 42 together, keeping the intermediate slices from separating. It will be noted that, contrary to FIG. 2, the natural tendency of the intermediate slices that leave the cutter blades 20 tend to re-contact one another and reform themselves in a rounded configuration. Thus, the intermediate slices 42 tend to move together to the awaiting transfer plate 78 (FIG. 14).

FIGS. 8 and 11 show transfer plate 78 positioned below the cutter blades 20. FIG. 14 shows the mechanical actuators for the transfer plate 78. L-shaped support arms 102 and 103 are mounted to bearings 104 and 105, and lifting cylinders 106 and 107 operate to oscillate the distal ends of the lifting arms about the bearings. When the lifting cylinders 106 and 107 are actuated to distend their cylinder rods, the ends of the L-shaped support arms 102 and 103 move downwardly and the transfer plate 78 moves downwardly.

In the meantime, in order that transfer plate 78 move only vertically, guides 108 and 109 that are supported in a stationary position on opposite sides of the transfer plate have their guide blocks 110 (only one shown) that are confined to vertical movement. The guide blocks are connected to the plate support bars 112, 113. The transfer plate 78 comprises two plate sections, 78A and 78B, that are movable apart, forming a center opening there between that allows the tomato slices to move downwardly from the transfer plate 78 under the influence of gravity. The ends of the two plate sections are supported by the plate support bars 112 and 113. Cylinders 115A-115D are connected to the plate support bars 112 and 113 for controlling the lateral movement of the plate sections 78A and 78B.

Gathering plates 100 are also supported by their cylinders to the plate support bars 112 and 113 so that the gathering plates are maintained in alignment with the slices of tomatoes when the slices are resting in edge standing attitude in the transfer plate before the slices are deposited from the transfer plate 78 into the awaiting shipping tray 80.

FIG. 16 shows the pick and place mechanism 60 that is of conventional design. It has a surface conveyor 61 that advances the tomatoes in rows laterally toward the slicer where the rows of tomatoes may be picked from the surface conveyor and placed in the openings 46 of the article positioning plate, where the tomatoes move into engagement with the cutter blades 20.

Operation

As shown in FIG. 5, the beginning of an article slicing procedure has the lateral positioning frame 64 and the vertical positioning frame 66 raised so that the article pushers 24 are spaced above and rearwardly of the article positioning openings 46 of the article positioning plate 44. This is designated as the loading position for the slicer 10. A pick and place machine such as shown in FIG. 14 or a worker places rows of tomatoes 11 in the article positioning openings 46 of the article positioning plate 44, with the longitudinal axes 12 (FIG. 1) of the tomatoes oriented transversely with respect to the cutter blades 20.

Once the tomatoes 11 are placed in the article openings 46, the lateral positioning frame 64 is shifted by its cylinder 68 to the position where the article pushers 24 are vertically aligned over the positions of the tomatoes 11 (FIG. 6).

Next, the vertical cylinder 70 moves the article pushers 24 downwardly through the positioning openings 46 of the positioning plates 44 and through the oscillating cutter blades 20 which cut the tomatoes into slices (FIG. 7).

Once the pusher fins 26 of the article pushers 24 have projected between the cutter blades 20 and the tomatoes have been sliced and removed from the cutter blades, the motion of the vertical cylinder 70 reverses to lift the article pushers 24 away from the cutter blades and the article positioning plate 44 back to the vertically aligned position (FIG. 8). The article pushers are then returned to the loading position of FIG. 9.

When the vertical positioning frame 66 has been moved to its down position as shown in FIGS. 7 and 11, the article pushers 24 will have moved the lower ends of the their pusher fins 26 far enough between the cutter blades 20, to assure that the tomato slices are separated from the cutter blades.

At any time during the movements described above, the sprayer nozzles 75 may be activated to apply a fluid to the pusher fins 26 of the article pushers and to the cutter blades 20 and to the surrounding surfaces. This tends to clean these surfaces.

FIGS. 7 and 11 show the tomatoes immediately after they have been pushed through the cutter blades 20 by the pusher fins 26. When the end cutter blades 20A and 20B cut the end slices 16 and 18 from the rest of the tomatoes, the end slices 16 and 18 move on the other side of the side walls 98A and 98B from the intermediate slices 42, so that the end slices are collected separately from the intermediate slices. The intermediate slices continue to move downwardly through the vertical passage 101 between the side walls 98A and 98B of the collectors 96 toward the transfer plate 78. The ejectors 120 (FIGS. 12 and 13) laterally engage against the end slices 16 and 18 to eject the end slices through the rear openings 119 of the end collectors 96. In the meantime, the other cutter blades 20 will have cut through the intermediate portion of the tomatoes, forming the intermediate slices 42.

Transfer plate 78 (FIGS. 8, 11 and 14) is positioned in the downward path of the sliced tomatoes below the collectors 96 and is movable vertically by its cylinders 106 and 107, to an up position where it is located closely adjacent the bottoms of the end collectors 96, for immediately receiving the lower portions of the intermediate slices of the tomatoes, just after the upper portions of the intermediate slices leave the cutter blades and before the upper portions of the tomatoes leave the vicinity of the side walls 98A and 98B, so that the bottoms of the intermediate slices of the tomatoes become supported about the time when they leave the confines of the side walls 98A and 98B.

The transfer plate 78 is raised and lowered during the cutting cycle. The transfer plate 78 is raised toward the cutting station to reduce the distance of movement of the slices from the cutting station to the transfer plate, to avoid dropping the intermediate slices of the tomatoes to the transfer plate a distance that would tend to disturb the arrangement of the slices or bruise the tomato slices or to lose the liquid in the slices.

Once the transfer plate 78 has received its sliced tomatoes, it is lowered for bringing the intermediate slices of the tomatoes in a downward direction from the slicing function toward the open top containers 80 and then opened to deposit the sliced tomatoes in a container 80.

In the meantime, gathering plates 100 (FIG. 14) that are aligned with the transfer plate 78 move toward each other along the length of the transfer plate so as to urge the separate groups of intermediate slices from each tomato toward a discharge position, usually at the center of the tray, thereby gathering the intermediate slices of the tomatoes of the several tomatoes in a smaller length that corresponds to the length of the cavity of the shipping container 80. The transfer plate is formed in two parts that move together to form a trough that receives the tomato slices and that move apart to allow the slices to move to containers 80 (FIG. 10) with minimum of disturbance. When the halves of the transfer plate are separated, the transfer plate is positioned less than one inch above the containers 80, usually about ¼ inch, so that the tomatoes tend to move gently from the transfer plate 78 downwardly into the cavities of the containers 80, thereby minimizing the loss of any liquid from the sliced tomatoes and avoiding bruising of the tomatoes.

A nozzle of the type shown in FIG. 6B may be positioned above the path of the containers 80 to apply fluid to the upper exposed portions of the tomatoes in the open top containers as they leave the slicer. The fluid may be the same as or different from the fluid applied to the pusher fins 26 and cutter blades 20.

Figure 15:
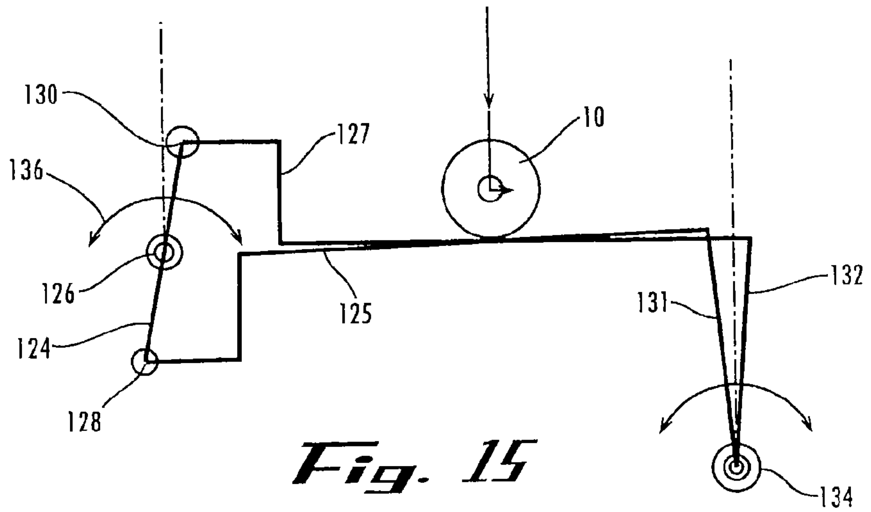
FIG. 15 is a schematic illustration of the cutter blade frames, showing how alternate ones of the blades oscillate in opposite directions.

FIG. 15 is a schematic illustration of the movements of the frames of the cutter blades. As previously stated, the cutter blades are mounted on a pair of frames, with all the blades in each frame positioned in the same plane, with the first alternate blades mounted on one frame and the second alternate blades mounted on another frame.

The left ends of frames 125 and 127 are mounted at opposite ends of an oscillating drive arm 124. Oscillating drive arm 124 is pivotal intermediate its ends at axle 126, with oscillating frame 125 connected to the lower end 128 of the arm 124, and the oscillating frame 127 connected at the upper end 130.

The other ends of the cutter blade frames 125 and 127 are mounted on levers 130 and 132, and the levers are pivotally mounted on axle 134. Tomatoes 11 are placed on the cutter blades of frames 125 and 127, with the longitudinal axes of the tomatoes oriented at a right angle with respect to the planes of the blades.

As the oscillating drive arm 124 oscillates as indicated by the double-headed arrow 136, the lower end 128 of the oscillating drive arm moves from dead center through an upward arc, while the upper end 130 moves from dead center through a downward arc. This causes the cutter blade frame 125 to move upwardly at one end while the cutter blade frame 127 moves downwardly at its same end. This changes the elevations of the blades as the blades oscillate, so that alternate ones of the blades rock upwardly through an arc while the other alternate blades rock downwardly through a different arc. These arcuate movements tend to cause every other blade to cut more aggressively through the tomatoes as they move upwardly than the other alternate blades that are moving downwardly while the tomatoes are being urged though all of the blades with a substantially constant force. This enhances the cutting function of the blades while applying less squeezing of the tomato slices through the cutter blades, allowing the tomatoes to be cut with the use of less pushing force applied to the tomatoes, thereby tending to preserve the tomatoes with less compression force as the cutting function proceeds.

Although a preferred embodiment of the invention has been disclosed in detail herein, it will be obvious to those skilled in the art that variations and modifications of the disclosed embodiment can be made without departing from the spirit and scope of the invention as set forth in the following claims.

We claim:

1. An article slicing apparatus for simultaneously cutting several articles into multiple parallel slices, comprising:

a plurality of elongated cutter blades extending parallel to and spaced from one another for cutting the articles placed on said cutter blades into slices, a blade actuator connected to said cutter blades for oscillating said cutter blades, article pushers each sized and shaped to move from above said cutter blades downwardly into engagement against the articles placed on said cutter blades to push the articles through said cutter blades, said article pushers including a plurality of fins sized and shaped to pass between said cutter blades, pusher actuating means operatively connected to said article pushers for moving said article pushers laterally from an article loading position to an aligned position above said cutter blades, downwardly from above said cutter blades to move said fins between said cutter blades and push the articles downwardly through said cutter blades, upwardly to withdraw said article pushers from said cutter blades, and laterally back to the article loading position to withdraw said article pushers from over said cutter blades, and a pick and placer including an actuator movable in timed relationship with said pusher actuating means to advance the articles toward the aligned positions above the cutter blades and place the articles on the cutter blades as the pusher actuating means withdraws the pushers away from the aligned positions toward the loading position, and to withdraw from the aligned positions as the pusher actuating means moves from the loading positions toward the aligned position, such that the progressive rearward movement of the article pushers to the article loading positions progressively forms a space for said pick and placer to progressively move in the same direction above the cutter blades to load the articles on the cutter blades, and as the article pushers progressively move forwardly to aligned positions above the positions where the articles are placed on the cutter blades, the pick and placer progressively withdraws from the aligned positions above the cutter blades.

2. An article slicing apparatus for simultaneously cutting several articles into multiple parallel slices, comprising:

a plurality of elongated cutter blades extending parallel to and spaced from one another for cutting the articles placed on the cutter blades into slices, a blade actuator connected to said cutter blades for oscillating the cutter blades, a plurality of article pushers each sized and shaped to move from above the cutter blades downwardly into engagement against the articles placed on the cutter blades to push the articles through the cutter blades, pusher actuating means operatively connected to said plurality of article pushers for progressively moving the plurality of article pushers in sequence while maintaining the article pushers in a constant orientation:

from above the cutter blades at article loading positions (a) to positions spaced laterally away from above the positions on the cutter blades where the articles are to be placed on the cutter blades for facilitating the placement of articles on the cutter blades, forwardly to aligned positions (b) above the cutter blades at the positions where the articles are to be placed on the cutter blades, downwardly to down positions (c) to push the articles downwardly through the cutter blades, upwardly to return to the aligned positions (b) above the cutter blades, and rearwardly to withdraw the article pushers laterally back to the article loading positions (a), a pick and placer positioned adjacent said cutter blades for picking the articles and placing the articles on said cutter blades, said pick and placer including an actuator movable in timed relationship with said pusher actuating means to advance the articles toward the aligned positions (b) above the cutter blades and place the articles on the cutter blades as the pusher actuating means withdraws the pushers away from the aligned positions (b) toward the loading position (a), and to withdraw from the aligned positions (b) as the pusher actuating means moves from the loading positions (a) toward the aligned positions (b), such that the progressive rearward movement of the article pushers to the article loading positions progressively forms a space for said pick and placer to progressively move in the same direction above the cutter blades to load the articles on the cutter blades, and as the article pushers progressively move forwardly to aligned positions above the positions where the articles are placed on the cutter blades, the pick and placer progressively withdraws from the aligned positions above the cutter blades.

3. The article slicing apparatus of claim 2, wherein:

said article pushers including a plurality of fins that are sized and shaped to pass between said cutter blades.

4. The article slicing apparatus of claim 2, and further including:

a transfer plate positioned beneath the cutter blades a distance for receiving the sliced articles from the cutter blades substantially without dropping the articles from the cutter blades, guides for guiding the slices as they are being received on the transfer plate to avoid the slices of each article from separating when received on the transfer plate and to avoid the slices from tilting, and gathering members movable with respect to said transfer plate for engaging and gathering the slices on the transfer plate in an edge standing attitude.

5. The article slicing apparatus of claim 4, and wherein said guides include end collectors for receiving the end slices of the articles.

6. The article slicing apparatus of claim 4, and further including:

a transfer plate actuator for moving said transfer plate vertically away from said cutter blades for depositing the sliced articles to a lower surface and minimizing the distance from the transfer plate and the surface to which the sliced articles are deposited.

7. The article slicing apparatus of claim 2, and further including:

an article positioning plate between the cutter blades and the pushers, the article positioning plate defining a series of openings sized to receive the articles without holding the articles off the cutter blades.

8. The article slicing apparatus of claim 7, wherein the openings are oval.

9. The article slicing apparatus of claim 2, and further including:

said article pushers each including a plurality of fins sized and shaped for passing between the cutter blades, and a fluid delivery port mounted to each article pusher configured to apply fluid to the plurality of fins of the article pushers.

10. The article slicing apparatus of claim 2, wherein:

said article pushers include a plurality of fins sized and shaped to pass between said cutter blades, and fluid delivery means mounted on each said article pusher, said fluid delivery means including a fluid delivery port that delivers fluid to said fins of said pushers.

11. The article slicing apparatus of claim 2, wherein:

the blade actuator is configured to oscillate the cutter blades with first alternate ones of the blades moving in opposite directions than the second alternate blades, and at least one end of the first alternate blades moving in an upward arc as an end of the other alternate blades are moving in a downward arc.

* * * * *